(12) United States Patent
Li et al.

(10) Patent No.: US 10,860,654 B2
(45) Date of Patent: Dec. 8, 2020

(54) SYSTEM AND METHOD FOR GENERATING AN ANSWER BASED ON CLUSTERING AND SENTENCE SIMILARITY

(71) Applicants: Beijing Jingdong Shangke Information Technology Co., Ltd., Beijing (CN); JD.com American Technologies Corporation, Mountain View, CA (US)

(72) Inventors: Sijia Li, Mountain View, CA (US); Guangtao Wang, Mountain View, CA (US); Jin Guo, Mountain View, CA (US)

(73) Assignees: Beijing Jingdong Shangke Information Technology Co., Ltd., Beijing (CN); JD.com American Technologies Corporation, Mountain View, CA (US)

(*) Notice: Subject to any disclaimer, the term of this patent is extended or adjusted under 35 U.S.C. 154(b) by 120 days.

(21) Appl. No.: 16/367,395

(22) Filed: Mar. 28, 2019

(65) Prior Publication Data

US 2020/0311145 A1    Oct. 1, 2020

(51) Int. Cl.
*G06F 16/903* (2019.01)
*G06F 16/9032* (2019.01)
(Continued)

(52) U.S. Cl.
CPC ...... *G06F 16/90332* (2019.01); *G06F 16/906* (2019.01); *G06F 16/90344* (2019.01); *G06N 5/022* (2013.01)

(58) Field of Classification Search
CPC .............................. G06F 16/906; G06N 5/022
See application file for complete search history.

(56) References Cited

U.S. PATENT DOCUMENTS 8,819,007 B2    8/2014  Brown et al.
10,360,265 B1 *  7/2019  Agarwal ........... G06F 16/90332
(Continued)

OTHER PUBLICATIONS

Guangtao Wang and Qinbao Song, Automatic clustering via outward statistical testing on density metrics, IEEE Transactions on Knowledge and Data Engineering, 2016, 28 (8): 1971-1985.
(Continued)

*Primary Examiner* — Abul K Azad
(74) *Attorney, Agent, or Firm* — China Science Patent & Trademark US LLC; Shanyun Lu

(57) ABSTRACT

A method and system for generating an answer to a question. The system includes a computing device. The computing device has a processor and a storage device storing computer executable code. The computer executable code, when executed at the processor, is configured to: receive the question inputted by a user regarding a product; extract target answers from a question-answer (QA) knowledge base using the question to form an answer set; extract user comments regarding the product from a comment database to form a comment set; cluster keywords in the answer set to obtain cluster centers; filter the answer set and the comment set using the cluster centers to obtain answer subset and comment subset; and generate the answer to the question from the comment subset, wherein the answer is selected from the comment subset and has high sentence similarity to sentences in the answer subset.

20 Claims, 6 Drawing Sheets

(51) Int. Cl.
*G06N 5/02* (2006.01)
*G06F 16/906* (2019.01)

(56) References Cited

U.S. PATENT DOCUMENTS

| | | | |
|---|---|---|---|
| 2016/0042275 A1* | 2/2016 | Dettman | G06N 5/003 706/46 |
| 2016/0196334 A1* | 7/2016 | Bastide | G06F 16/3344 707/776 |
| 2016/0203208 A1* | 7/2016 | Anderson | G06F 16/353 707/722 |
| 2018/0150739 A1* | 5/2018 | Wu | G06Q 10/1053 |
| 2020/0097598 A1* | 3/2020 | Anderson | G10L 15/22 |

OTHER PUBLICATIONS

Hongjie Jia et al., Self-tuning p-spectral clustering based on shared nearest neighbors, Cognitive Computation, 2015, 7(5): 622-632.

* cited by examiner

SYSTEM AND METHOD FOR GENERATING AN ANSWER BASED ON CLUSTERING AND SENTENCE SIMILARITY

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to building an answer generation system for question answer (QA) systems, and more particularly to systems and methods for building an answer generation system based on word embedding, clustering of embedded words, and sentence similarity measurement utilizing rich question answer data and product comment data available on e-commerce platforms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Current question answer (QA) systems only focus on providing factual answers to user queries such as facts about products, lists of products, definitions of terms, and how to install/use products. Existing techniques cannot find answers for many types of questions, since there are so many possible variations in users' questions resulting from the words used, order of words in questions, and semantical constraints implied in the questions.

Therefore, an unaddressed need exists to provide answers to those questions which don't have exact answers based on current knowledge graph.

SUMMARY

In certain aspects, the present disclosure relates to a system for generating an answer to a user (or customer) question. In certain embodiments, the system includes a computing device. The computing device has a processor and a storage device storing computer executable code. The computer executable code, when executed at the processor, is configured to:

receive the question inputted by a user regarding a product;

extract target answers from a question-answer (QA) knowledge base using the question to form an answer set;

extract user comments regarding the product from a comment database to form a comment set;

cluster keywords in the answer set to obtain cluster centers;

filter the answer set and the comment set using the cluster centers to obtain answer subset and comment subset; and generate the answer to the question from the comment subset, wherein the answer is selected from the comment subset and has high sentence similarity to sentences in the answer subset.

In certain embodiments, the computer executable code is configured to extract answers from the QA knowledge base by: calculating sentence similarities between the question inputted by the user and questions in the QA knowledge base; and defining one of the questions in the QA knowledge base that has a maximum similarity among the calculated similarities as a most similar question, wherein the target answers are answers to the most similar question. In certain embodiments, the questions in the QA knowledge base used for comparison only include question under a product category, where the product in the user question belongs to the product category.

In certain embodiments, the computer executable code is configured to calculate the sentence similarity between the question inputted by the user and one of the answers in the QA knowledge base by:

decomposing the question inputted by the user into word vectors $v_{A1}, v_{A2}, \ldots, v_{An}$ using a word2vec model, and decomposing the one of the answers in the QA knowledge base into word vectors as $v_{B1}, v_{B2}, \ldots, v_{Bn}$ using the word2vec model, wherein the question inputted by the user is represented by $S_A$ and comprises m number of words, and the one of the answers in the QA knowledge base user is represented by $S_B$ and comprises n number of words;

calculating a similarity distance $s(v_i, v_j)$ between one of the vectors in $S_A$ and one of the vectors in $S_B$, wherein i is one of A1 to Am, and j is one of B1 to Bm;

calculating an inverse document frequency (IDF) for the word vector $v_i$ as:

$$idf_i = \log \frac{C}{C_i + 1},$$

wherein C is a total number of comments in the comment database, and $C_i$ is a total number of comments in the comment database that contain the word corresponding to the word vector $v_i$; and calculating the sentence similarity between $S_A$ and $S_B$ using:

$$sim(S_A, S_B) = \sum_{i=1}^{m} idf_i \times \max_{j=1 \text{ to } n} s(v_i, v_j).$$

In certain embodiments, the computer executable code is configured to cluster the keywords in the answer set to obtain the cluster centers by:

converting keywords in the answer set into keyword vectors;

calculating a K-density $\hat{\rho}_i$ of one of the keyword vector i by:

$$\hat{\rho}_i = \frac{K}{\sum_{j=1}^{K} d_{i,j}},$$

where $\hat{\rho}_i$ is the K-density of the keyword vector i, $d_{i,j}$ is a distance between the keyword vector i and one of the keyword vectors j, K is a predetermined positive integer, and the keyword vectors j from 1 to K are nearest neighbors of the keyword vector i;

calculating a minimum density-based distance $\hat{\delta}_i$ by:

$$\hat{\delta}_i = \min_{j \neq i \wedge \hat{\rho}_i < \hat{\rho}_l} (d_{i,l}),$$

wherein l is one of the keyword vectors that has a K-density $\hat{\rho}_l$ higher than the K-density $\hat{\rho}_i$ and is the nearest to the keyword vector i;

calculating a keyword vector product $x_i$ by $x_i = \hat{\rho}_i \times d_{i,j}$ for each keyword vector i; and selecting a plurality of the keyword vectors as cluster centers based on the values of the keyword vector products, wherein values of the keyword vector product of the cluster centers are greater than values of the keyword vector product of non-cluster centers.

In certain embodiments, the keyword vectors are indexed by integers 1 to n sequentially base on the values of the keyword vector products from low to high, a non-cluster center having a highest keyword vector product has the index o, and $x_{o+1} - x_o \geq 1.5 \times (x_{o+2} - x_{o+1})$. In certain embodiments, n−o is greater than 5. In certain embodiments, K is $\lfloor \sqrt{n} \rfloor$, and n is a total number of the keywords in the answer set.

In certain embodiments, the computer executable code is configured to generate the answer to the question by: calculating sentence similarities between sentences in the comment subset and sentences in the answer subset; defining an average sentence similarity value between one of the sentences in the comment subset and all the sentences in the answer subset as a sentence-answer subset similarity value of the one of the sentences in the comment subset; selecting a predetermined number of sentences in the comment subset that have highest sentence-answer subset values; and choosing one of the predetermined number of sentences as the answer to the question. In certain embodiments, the predetermined number is in a range of 3-10.

In certain embodiments, the step of calculating sentence similarities between sentences in the comment subset and sentences in the answer subset includes:

decomposing one of the sentences in the comment subset into word vectors $v_{D1}, v_{D2}, \ldots, v_{Dp}$ using a word2vec model, and decomposing the one of the sentences in the answer subset into word vectors as $v_{E1}, v_{E2}, \ldots, v_{Eq}$ using the word2vec model, wherein the one of the sentences in the comment subset is represented by $S_D$ and comprises p number of words, and the one of sentences in the sub answer set is represented by $S_E$ and comprises q number of words;

calculating a similarity distance $s(v_i, v_j)$ between one of the vectors in $S_D$ and one of the vectors in $S_E$, wherein i is one of D1 to Dp, and j is one of E1 to Eq;

calculating an inverse document frequency (IDF) for the word vector $v_i$ as:

$$idf_i = \log \frac{C}{C_i + 1},$$

wherein C is a total number of sentences in the comment subset, and CL is a total number of sentences in the comment subset that contain the word corresponding to the word vector $v_i$; and calculating the sentence similarity between $S_D$ and $S_E$ using:

$$sim(S_D, S_E) = \sum_{i=1}^{p} idf_i \times \max_{j=1 \text{ to } q} s(v_i, v_j).$$

In certain aspects, the present disclosure relates to a method for generating an answer to a question. In certain embodiments, the method includes:

receiving, by a computing device, the question inputted by a user regarding a product;

extracting, by the computing device, target answers from a question-answer (QA) knowledge base using the question to form an answer set;

extracting, by the computing device, user comments regarding the product from a comment database to form a comment set;

clustering, by the computing device, keywords in the answer set to obtain cluster centers;

filtering, by the computing device, the answer set and the comment set using the cluster centers to obtain answer subset and comment subset; and generating, by the computing device, the answer to the question from the comment subset, wherein the answer is selected from the comment subset and has high sentence similarity to sentences in the answer subset.

In certain embodiments, the step of extracting answers from the QA knowledge base includes: calculating sentence similarities between the question inputted by the user and questions in the QA knowledge base; and defining one of the questions in the QA knowledge base that has a maximum similarity among the calculated similarities as a most similar question, wherein the target answers are answers to the most similar question.

In certain embodiments, the step of calculating the sentence similarity between the question inputted by the user and one of the answers in the QA knowledge base includes:

decomposing the question inputted by the user into word vectors $v_{A1}, v_{A2}, \ldots, v_{Am}$ using a word2vec model, and decomposing the one of the answers in the QA knowledge base into word vectors as $v_{B1}, v_{B2}, \ldots, v_{Bn}$ using the word2vec model, wherein the question inputted by the user is represented by $S_A$ and comprises m number of words, and the one of the answers in the QA knowledge base user is represented by $S_B$ and comprises n number of words;

calculating a similarity distance $s(v_i, v_j)$ between one of the vectors in $S_A$ and one of the vectors in $S_B$, wherein i is one of A1 to Am, and j is one of B1 to Bm;

calculating an inverse document frequency (IDF) for the word vector $v_i$ as:

$$idf_i = \log \frac{C}{C_i + 1},$$

wherein C is a total number of comments in the comment database, and $C_i$ is a total number of comments in the comment database that contain the word corresponding to the word vector $v_i$; and calculating the sentence similarity between $S_A$ and $S_B$ using:

$$sim(S_A, S_B) = \sum_{i=1}^{m} idf_i \times \max_{j=1 \text{ to } n} s(v_i, v_j).$$

In certain embodiments, the step of clustering the keywords in the answer set to obtain the cluster centers includes:
converting keywords in the answer set into keyword vectors;
calculating a K-density $\hat{\rho}_i$ of one of the keyword vector i by:

$$\hat{\rho}_i = \frac{K}{\sum_{j=1}^{K} d_{i,j}},$$

wherein $\hat{\rho}_i$ is the K-density of the keyword vector i, $d_{i,j}$ is a distance between the keyword vector i and one of the keyword vectors j, K is a predetermined positive integer, and the keyword vectors j from 1 to K are nearest neighbors of the keyword vector i;
calculating a minimum density-based distance $\hat{\delta}_i$ by:

$$\hat{\delta}_i = \min_{j \neq i \wedge \hat{\rho}_i < \hat{\rho}_l} (d_{i,l}),$$

wherein l is one of the keyword vectors that has a K-density $\hat{\rho}_l$ higher than the K-density $\hat{\rho}_i$ and is the nearest to the keyword vector i;
calculating a keyword vector product $x_i$ by $x_i = \hat{\rho}_i \times d_{i,j}$ for each keyword vector i; and
selecting a plurality of the keyword vectors as cluster centers based on the values of the keyword vector products, wherein values of the keyword vector product of the cluster centers are greater than values of the keyword vector product of non-cluster centers.

In certain embodiments, the keyword vectors are indexed by integers 1 to n sequentially base on the values of the keyword vector products from low to high, a non-cluster center having a highest keyword vector product has the index o, and $x_{o+1} - x_o \geq 1.5 \times (x_{o+2} - x_{o+1})$. In certain embodiments, K is $\lfloor \sqrt{n} \rfloor$, and n is a total number of the keywords in the answer set.

In certain embodiments, the step of generating the answer to the question includes: calculating sentence similarities between sentences in the comment subset and sentences in the answer subset; defining an average sentence similarity value between one of the sentences in the comment subset and all the sentences in the answer subset as a sentence-answer subset similarity value of the one of the sentences in the comment subset; selecting a predetermined number of sentences in the comment subset that have highest sentence-answer subset values; and choosing one of the predetermined number of sentences as the answer to the question. In certain embodiments, the predetermined number is in a range of 3-10.

In certain embodiments, the step of calculating sentence similarities between sentences in the comment subset and sentences in the answer subset includes:
decomposing one of the sentences in the comment subset into word vectors $v_{D1}, v_{D2}, \ldots, v_{Dp}$ using a word2vec model, and decomposing the one of the sentences in the answer subset into word vectors as $v_{E1}, v_{E2}, \ldots, v_{Eq}$ using the word2vec model, wherein the one of the sentences in the comment subset is represented by $S_D$ and comprises p number of words, and the one of sentences in the sub answer set is represented by $S_E$ and comprises q number of words;
calculating a similarity distance $s(v_i, v_j)$ between one of the vectors in $S_D$ and one of the vectors in $S_E$, wherein i is one of D1 to Dp, and j is one of E1 to Eq;
calculating an inverse document frequency (IDF) for the word vector $v_i$ as:

$$idf_i = \log \frac{C}{C_i + 1},$$

wherein C is a total number of sentences in the comment subset, and C is a total number of sentences in the comment subset that contain the word corresponding to the word vector $v_i$; and
calculating the sentence similarity between $S_D$ and $S_E$ using:

$$sim(S_D, S_E) = \sum_{i=1}^{p} idf_i \times \max_{j=1 \text{ to } q} s(v_i, v_j).$$

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
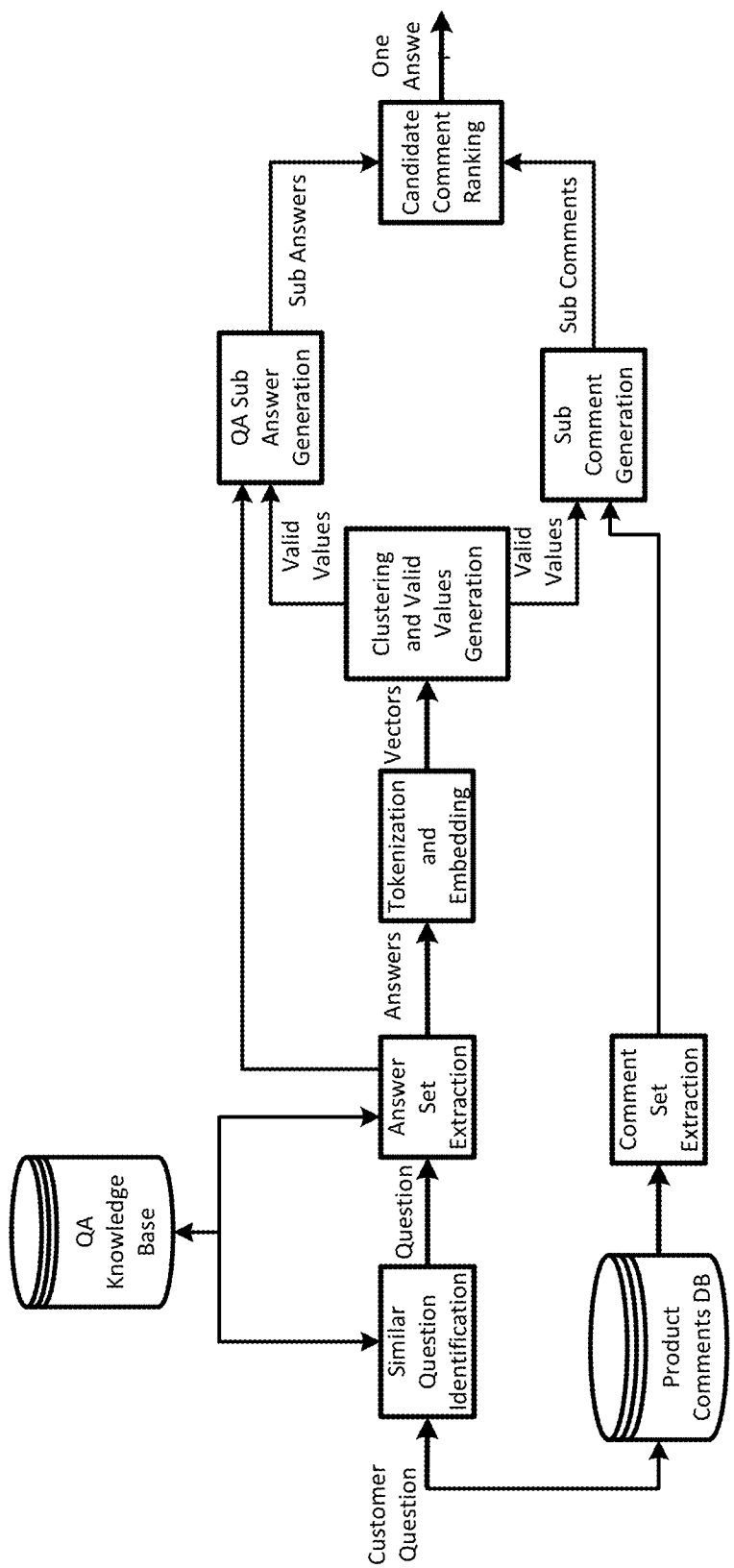
FIG. 1 schematically depicts a framework of a QA answer generation system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, to utilize the rich and large volume of question answer (QA) data available on e-commerce platforms, the present disclosure provides a framework for an intelligent answer generation system, to generate top candidate answers for customer service representatives (CSR) to select in response to user inquiries.

In certain embodiments, only factual direct answers are provided in response to user inquiries without leveraging the large amount of user comments available regarding the products involved in the user inquires. However, we believe from these rich user comments, useful information can be extracted and provided to users as supplemental suggestions beyond the factual answers. In certain embodiment, these supplemental suggestions contains information about product application scenarios, or why/why not information. In one example, if a customer asks "what is the volume of a refrigerator?" besides the direct factual answer "the volume is 20 to 30 cubic feet," a supplemental suggestion such as "it is suitable for a family of three to four people" can be provided.

Further, not all user questions can be answered due to the large number of variations in users' questions resulting from the question components such as words used, order of words in questions, and semantical constraints implied in the questions etc.

To overcome these challenges and disadvantages, in certain aspect, the present disclosure provides a framework to build an intelligent QA answer generation system based on the large amount of QA data generated between CSRs and customers and between customers (QA knowledge base) as well as product comments data generated by customers (product comments DB) in a e-commerce platform. FIG. 1 schematically shows a framework (or flowchart) according to certain embodiments of the present disclosure. As shown in FIG. 1, when a customer inputs a question, the framework compares the customer question with all or certain category of questions in the QA knowledge base to find the most similar question, and uses the most similar question to extract an answer set from the QA knowledge base. The framework then tokenizes and embedding the answers in the answer set to obtain keyword vectors. Then the framework clusters the keyword vectors, and the cluster centers are regarded as valid values, which are the most important keywords chosen from the keyword vectors.

At the same time, when the customer inputs the question, the framework also uses the identification, such as an SKU of the product related to the question, to extract a comment set from the product comments database. The comments set includes comments that are made or listed under that product, or all comments that are related to that products.

With the answer set, comment set, and valid values available, the framework uses the valid values (the most important keywords) to respectively filter the answer set and the comment set, to obtain an answer subset and a comment subset. The framework then compares the similarity between the sentences in the answer subset and the sentences in the comment subset, and chooses a predetermined number comments from the comment subset as top candidate answers, where the top candidate answers has high similarity to the sentences in the answer subset. The predetermined number may be in a range of 3-10, and in one embodiment is 5. Finally, the framework presents the top candidate answers to a customer service representative, such that the customer service representative can select one of the top candidate answers, and return the selected answer to the customer who inputted the question. In certain embodiments, the framework may also present the one top candidate answer directly to the user without interaction with the customer service representative. In certain embodiments, the framework may also present all the top candidate answers to the user.

By combining the global QA knowledge base information through the e-commerce platform, and the comment information pertinent to the specific product, the framework can accurately locate the most relevant answer(s) to the customer question in regard to one product.

Figure 2:
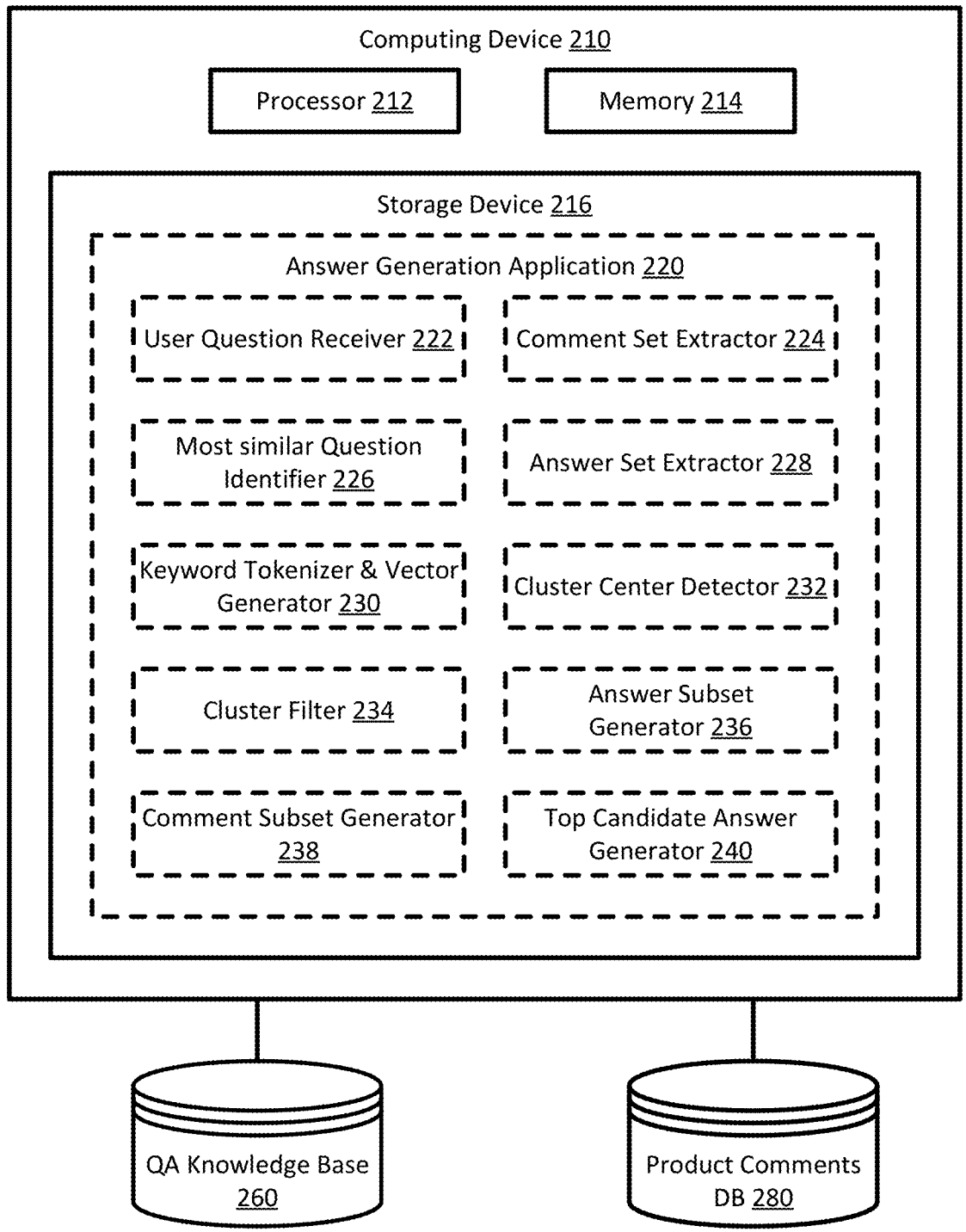
FIG. 2 schematically depicts a QA answer generation system according to certain embodiments of the present disclosure.

FIG. 2 schematically depicts an intelligent QA answer generation system according to certain embodiments of the present disclosure. In certain embodiments, the system 200 shown in FIG. 2 are used to implement the framework in FIG. 1. As shown in FIG. 2, the system 200 includes a computing device 210. In certain embodiments, the computing device 210 may be a server computer, a cluster, a cloud computer, a general-purpose computer, or a specialized computer, which generates top k candidate answers in response to user inquiries based on data in QA knowledge base and product comments data, where k is a predetermined positive integer in a range of about 3-10. In one embodiment, k is 5. In certain embodiments, the computing device 210 may communicate with other computing devices or services, so as to obtain QA knowledge base and product comments data from those computing devices. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media. In certain embodiments, the computing device 210 provides an interface for each of a large number of user computing devices, such as personal computers, tablet, or smart phones, such that users can communicate with the computing device 210 via the interface, send questions on products, and read returned answer by the computing device 210.

The QA knowledge base 260 is accessible to the computing device 210 and may be updated regularly. In certain embodiments, the QA knowledge base 260 is being updated constantly. The QA knowledge base 260 records the questions raised by customers under a specific product listing and corresponding answers provided by other customers. In certain embodiment, the manufacturers or suppliers or sellers of the product may provide answers to user questions too. The product knowledge base 260 also records the online chat conversations between customer service representatives and customers regarding particular products. In certain embodiments, the question-answers in the QA knowledge base 260 are organized by product categories or SKUs. In the product QA knowledge base 260, each product is associated with a set of questions customers previously asked on the e-commerce platform. Each question has a list of answers associated with it. The QA knowledge base 260 may be stored on the computing device 210, or on other server computing devices that is accessible by the computing device 210. Because the QA knowledge base 260 includes questions and answers from different resources, it is more like a global database across the e-commerce platform.

In certain embodiment, the QA knowledge base 260 may go through a normalization process. There could be multiple questions asked for a particular product by the customers. Some questions could be very similar in nature, thus there is no need to keep all of them. Instead, these similar questions can be merged into a representative question. This reduces the amount of data the system needs to store and process. Furthermore, each customer question could be associated with a list of answers provided by CSRs and other fellow customers or other parties such as manufacturers, suppliers etc. Again, some of these answers could be very similar in nature, and thus they can be merged into a representative one. In certain embodiments, the normalization process for the QA knowledge base 260 may include comparing the questions or answers using the similarity measurement method shown in FIG. 5. After this normalization, each product is associated with a set of distinct questions, with each question associated with a set of distinct answers.

The product comments database (DB) 280 is accessible to the computing device 210 and may be updated regularly. In certain embodiments, the product comments DB 280 is being updated constantly. The product comments DB 280 records the comments about products provided by customers, normally the comments listed under product webpages. Each product has a list of comments associated it. The comments are about anything the customers can comment on a product, including pros and cons, typical usage, why they like/dislike it etc. The product comments DB 280 may be stored on the computing device 210, or on other server computing devices that is accessible by the computing device 210.

In certain embodiments, the product comments DB 280 is arranged by identification of the products such as stock keeping units (SKUs or sku_id), where comments on the same products are placed under or indexed by the corresponding SKU. In certain embodiments, the products comments DB 280 may further normalize the comments for each product, for example using the similarity measurement method shown in FIG. 5, so as to merge similar comments to reduce redundancy. After this normalization, each product is associated with a set of distinct comments.

As shown in FIG. 2, the computing device 210 may include, without being limited to, a processor 212, a memory 214, and a storage device 216. In certain embodiments, the computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the computing device 210. The processor 212 can execute an operating system (OS) or other applications of the computing device 210. In some embodiments, the computing device 210 may have more than one CPU as the processor, such as two CPUs, four CPUs, eight CPUs, or any suitable number of CPUs. The memory 214 can be a volatile memory, such as the random-access memory (RAM), for storing the data and information during the operation of the computing device 210. In certain embodiments, the memory 214 may be a volatile memory array. In certain embodiments, the computing device 210 may run on more than one memory 214. The storage device 216 is a non-volatile data storage media for storing the OS (not shown) and other applications of the computing device 210. Examples of the storage device 216 may include non-volatile memory such as flash memory, memory cards, USB drives, hard drives, floppy disks, optical drives, solid-state drive (SSD) or any other types of data storage devices. In certain embodiments, the storage device 216 may be a local storage, a remote storage, or a cloud storage. In certain embodiments, the computing device 210 may have multiple storage devices 216, which may be identical storage devices or different types of storage devices, and the applications of the computing device 210 may be stored in one or more of the storage devices 216 of the computing device 210. In certain embodiments, the computing device 210 is a cloud computer, and the processor 212, the memory 214 and the storage device 216 are shared resources provided over the Internet on-demand.

As shown in FIG. 2, the storage device 216 includes an answer generation application 220. The answer generation application 220 is configured to generate top k candidate answers in response to customer or user inputted question based on the QA knowledge base 260 and the product comments DB 280. As described above, the QA knowledge base 260 is retrievable from the e-commerce platform and made available to the answer generation application 220. The product comments DB 280 is also retrievable from the e-commerce platform and made available to the answer generation application 220.

The answer generation application 220 includes, among other things, a user question receiver 222, a comment set extractor 224, a most similar question identifier 226, an answer set extractor 228, a keyword tokenizer and vector generator 230, a cluster center detector 232, a cluster center filter 234, an answer subset generator 236, a comment subset generator 238, and a top candidate answer generator 240. In certain embodiments, the answer generation application 220 may include other applications or modules necessary for the operation of the answer generation application 220. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the answer generation application 220 may be located at a remote computing device or distributed in a cloud.

The user question receiver 222 is configured to take a user question or customer question via an interface, such as via a graphic user interface (GUI) under a question/answer section of a product webpage of the e-commerce platform, or via a chat session between a customer and a CSR supported by the e-commerce platform. In certain embodiment, the user asks a question under a specific product webpage or provides a product identification through the chat session, so the product's SKU is known and thus associated with the question. After receiving the question, the user question receiver 222 is configured to send at least one of the user question and the associated SKU to the comments set extractor 224 and the most similar question identifier 226.

The comment set extractor 224 is configured to, upon receiving the SKU from the user question receiver 222, retrieve comments related to the SKU from the product comments DB 280 to form a comment set, and send the comment set to the comment subset generator 238. Because the comments in the product comments DB 280 are organized by products (or SKUs), the SKU information itself is sufficient to retrieve the comment set related to the question. Therefore, the question itself inputted by the customer may not be necessary for retrieving the comment set. In certain embodiments, the comment set extractor 224 may also use the question information to filter or expand the comment set.

The most similar question identifier 226 is configured to, upon receiving the user inputted question and optionally the SKU, identify a question in the QA knowledge base 260 that is most similar to the user input question. In certain embodiments, the most similar question identifier 226 is configured to employ the similarity measurement method (explained in FIG. 5) using the user inputted question against the questions in the QA knowledge base 260 to find the most similar question. Specifically, the most similar question identifier 226 is configured to calculate the similarity between the user inputted question and each questions in the QA knowledge base 260, and identify the most similar question that has the maximum similarity to the user inputted question. In certain embodiments, if the maximum similarity reaches a certain threshold, the question with the maximum similarity is treated as the most similar question. In certain embodiments, the threshold is set to a range of 0.5-0.8. In one embodiment, the threshold is set at 0.8. When the maximum similarity is less than the threshold, the answer generation application 220 may provide a response that no answer is available for this question. In certain embodiments, if there are more than 5 answers having similarities greater than the threshold of 0.8, only the top 5 answers or only the top answer is considered in the following steps. When the top 5 answers are considered, they are combined together in the following steps or processed separately in the following steps. In certain embodiments, the user inputted question is compared with all the questions in the QA knowledge base 260. In certain embodiments, the questions in the QA knowledge base 260 is organized by product categories, and the user question is compared with the questions in the QA knowledge base 260 that are under the same product category as the product described in the user inputted question. The most similar question identifier 226 is further configured to, after identifying the most similar question, send the most similar question to the answer set extractor 228.

The answer set extractor 228 is configured to, upon receiving the most similar question from the most similar question identifier 226, extract answers from the QA knowledge base 260 for the identified most similar question, and send the extracted answer set to the keyword tokenizer and vector generator 230 and the sub answer generator 236.

The keyword tokenizer and vector generator 230 is configured to, upon receiving the extracted answer set, decompose each of the answers in the answer set into a series of keywords (tokens), transform the keywords into vectors, and send the vectors to the cluster center detector 232. In certain embodiments, the answers in the answer set are in Chinese, and the keyword tokenizer and vector generator 230 uses a parser to decompose the answers into words, and uses a regular expression to clean the decomposed keywords. The cleaning process may include removing English words, numbers, and punctuations, and removing decomposed word that has only one Chinese character. For example, a sentence "可以免费 安装呀 (free installation)" is decomposed into a keyword sequence of "可以 (can be)/ 免费 (free)// 安装 (install)/ 呀 (a modal particle in Chinese)," and the last keyword "呀" is discarded because its length is only one character.

The keyword tokenizer and vector generator 230 is further configured to, after obtaining the decomposed and cleaned keywords, feed those keywords into word2vec for word embedding to obtain vectors corresponding to those keywords, and send the vectors to the cluster center detector 232. Word2vec is a group of related models that are used to produce word embeddings. In certain embodiments, the word2vec models are shallow, two-layer neural networks that are trained to reconstruct linguistic contexts of word. Word embedding is the collective name for a set of language modeling and feature learning techniques in natural language processing (NLP) where words or phrases from the vocabulary are mapped to vectors of real numbers. The embedding lookup generates a vector for each keyword. Each word is represented by one vector with many dimensions. In certain embodiment, the vectors are constructed with 300 dimensions for the decomposed and cleaned keywords. In certain embodiments, the word2vec training is initialized with product comment data from the product comments DB 280.

The cluster center detector 232 is configured to, upon receiving the keyword vectors, detect the cluster centers of the keyword vectors, and send the cluster centers to the cluster filter 234. In certain embodiments, the cluster center detector 232 is configured to detect the cluster centers using the following steps:

1. Assume the number of the keyword vectors received from the keyword tokenizer and vector generator 230 is n, and the n keyword vectors form a vector set. For each keyword vector i in the n keyword vectors, find its distances $d_{i,j}$ to other keyword vectors j in the vector set in their vector space. In other words, $d_{i,j}$ denotes the distance between object $O_i$ and $O_j$ (or the vectors i and j in the vector space). In certain embodiment, the distance is calculated with shared nearest neighborhood (SNN) or cosine similarity method. The smaller the value of $d_{i,j}$, the more similar or more close relation of the two vectors (in contrast, the larger the value of $s_{i,j}$, the more similar or more close relation of the two vectors, where $s_{i,j}=1-d_{i,j}$). After the calculation, K number of vectors that are nearest neighbors of the vector i are then determined, and termed vector j, where j is in a range of 1 to K.

2. For each keyword vector i, calculate its K-density $\hat{\rho}_i$ as:

$$\hat{\rho}_i = \frac{K}{\sum_{j=1}^{K} d_{i,j}}$$

In this formula, $d_{i,j}$ is calculated according to step 1, which is the distance from the vector i to the vectors j that are nearest neighbors of the vector i. K is a configurable parameter. Typically, K is associated with the number of nearest neighbors of vector i. In certain embodiments, K is defined in a range of 5-50, and in one embodiments, is set at 10. In certain embodiment, K is defined as $\lfloor \sqrt{n} \rfloor$, i.e., integer part of square root of n, where n is the total number of keyword vectors in the vector set. According to this formula, K vectors in the vector set that are nearest neighbors of the vector i are included for the calculation of $\hat{\rho}_i$. If the K vectors are very close to the vector i, the distances between the vector i and the K vectors are small, and the K-density of the vector i would be large. Otherwise, if the K vectors are generally far from the vector i, the distances between the vector i and the K vectors are large, and the K-density of the vector i would be small.

3. For each keyword vector i, find its minimum density-based distance $\hat{\delta}_i$ using:

$$\hat{\delta}_i = \min_{j \neq i \wedge \hat{\rho}_i < \hat{\rho}_j} (d_{i,j})$$

In this formula, for the given object $O_i$ (vector i in the vector space), there may be a plurality of objects j in the vector space that are not far from the object $O_i$ and have K-densities higher than the object $O_j$. Kindly note the objects j in the calculation of $\hat{\rho}_i$ and the objects j in the calculation of $\hat{\delta}_i$ are likely different from each other, where the objects j in the calculation of $\hat{\rho}_i$ are normally closer to the object i, while the objects j in the calculation of $\hat{\delta}_i$ are normally a little bit farther to the object i. The distances between the object $O_i$ and those neighboring high K-density objects $O_j$ are calculated, and the minimum one of the distances is defined as $\hat{\delta}_l$. This distance is between the object $O_i$ and the object that is closest to the object $O_i$ and has a higher K-density than the K-density of the object $O_i$. The smaller the $\hat{\delta}_l$, the low possibility that the vector i is a cluster center, because the nearby vector j having the higher K-density is more likely to be a cluster center and the $\hat{\delta}_l$ may be a member of the cluster having vector j is the cluster center. In certain embodiments, if a data set contains outliers, it is not enough to detect the clustering centers only with $\hat{\delta}_l$, because the outliers are usually far from other objects, and have large $\hat{\delta}_l$ as well.

4. For each keyword vector, calculate the product of its K-density $\hat{\rho}_l$ and minimum density-based distance $\hat{\delta}_l$, that is: $X_i = \hat{\rho}_l * \hat{\delta}_l$.

5. Put the above products of all keyword vectors together as a series and sort the series in descending (or ascending order). Those ordered list of products are defined as $X_1, X_2, X_3, \ldots, X_i, \ldots, X_n$, where the value of the products of the list is descending. Assume we put the list as a figure, the vector with the highest product value is put in the rightmost of the figure, and the vector with the lowest product value is put in the leftmost of the figure.

6. The cluster center detector 232 then determines a gap in the figure or the series. Among this series, starting from the rightmost vector toward left, find the obvious gap in this product series. In certain embodiment, a difference (delta) is calculated between the current vector and its left neighbor. It then compares this difference (delta) to the last delta. If the current delta is bigger than a threshold value of last delta, a gap is detected between the current vector and its left neighbor. In certain embodiments, the threshold value is 120%-500%. In one embodiment, the threshold is set at 150%, that is, if the current delta is 150% or greater than the previous delta, there is a gap between the current vector and its left neighbor. The gap location is recorded. In one example, a portion of the sorted product series for a vector set in ascending order has following content [ . . . 9.0, 12.0, 12.5, 13.1, 13.6, 14.2, 15]. Starting from the rightmost item, the differences between 2 neighboring items can be calculated as 15−14.2=0.8, 14.2−13.6=0.6, 13.6−13.1=0.5, 13.1−12.5=0.6, 12.5−12.0=0.5, 12.0−9.0=3.0. The difference series are: 0.8, 0.6, 0.5, 0.6, 0.5, and 3.0. In this series, only the difference 3.0 is bigger than 150% of its previous distance, which is 0.5. So, a gap is detected between the element 12.0 and its left neighbor 9.0.

7. All the vectors right to the gap are considered as the cluster centers. Usually it is necessary to find more than 5 to 10 cluster centers, so in certain embodiment, the gap search can start from $5^{th}$, $6^{th}$, $7^{th}$, $8^{th}$, $9^{th}$, or $10^{th}$ vector from the right in the sorted product series. Only one gap is needed.

8. After the cluster centers have been identified, put each remaining non-center vector into one of the clusters. Each cluster is built around one of the cluster centers detected based on the nearest neighbor with higher K-density. In certain embodiments, only the cluster centers are needed and it's not necessary to assign the other vectors to one of the cluster centers.

Once the cluster centers have been detected (optionally the clusters have been formed), the cluster center detector 226 is configured to send the cluster centers (and optionally the clusters) to the cluster filter 234.

The cluster filter 234 is configured to, upon receiving the generated cluster centers, remove invalid cluster centers to form a valid cluster center list, and send the valid cluster centers list to the answer subset generator 236 and the comment subset generator 238. In certain embodiments, the cluster filter 234 is configured to convert the valid cluster center list into corresponding keywords before sending them to the answer subset generator 236 and the comment subset generator 238. The converted keywords are termed valid keywords or valid values. In certain embodiment, the cluster filter 234 uses a deep parser method for filtering the cluster centers to obtain valid cluster centers. The following are steps of removing invalid clusters using the deep parser method:

1. Consider the cluster centers for each cluster and mark up the centers in a corpus as corresponding to a set of different part of speech:
   a. If a word exists in the corpus, the deep parser system directly provides a set of features for the word.
   b. If a word is too long for the deep parser to read, the deep parser provides a structure-based subgraph for the word. Each lower node has its own features, and the part of speech of the whole word can be extracted based on particular rules.

In certain embodiment, acquiring the keyword features mentioned above is through an application programming interface (API) call to the deep parser engine. The deep parser engine is an external component made available to the answer generation application 220, specifically to the cluster filter 234.

2. Filter the cluster centers according to the features of each center. A valid cluster center keyword must be a noun or a verb but not be a stop word which does not have an actual meaning. In this deep parser method, words with features "N," "nc," "DE," "NE," "V," "vc" are preserved and words with "xC," "MD," "RC" are dropped, where "N" indicates noun such as "cat," "nc" indicates unambiguous noun, such as "apple," "DE" indicates data entity such as "customer," "NE" indicates noun entity such as "apple," "V" indicates verb such as "work," "vc" indicates verbal cues such as "explain," "xC" indicates small words such as "lot," "MD" indicates modal verb such as "can," and "RC" indicates relative clause such as "that." In certain embodiment, typically about 60% of the cluster centers are dropped and about 40% cluster centers are kept. In one example, there are about 50 received cluster centers, and after the deep parser filtering, the cluster filter 234 drops about 30 invalid cluster centers and the remaining 20 cluster centers become the valid cluster centers.

In certain embodiment, the cluster filter 234 is configured to use stop words method for filtering the cluster centers instead of using the deep parser engine. In this method, the cluster filter 234 is configured to determine whether each keyword corresponding to the cluster centers is a stop word by checking it against the stop word data set, and discard the cluster center if its corresponding keyword is a stop word. In certain embodiments, the stop word dataset is initialized by clustering a large QA dataset to obtain clusters. The clusters are labeled with deep parser, and stop words are selected from the clusters based on the labels by the deep parser (such as the ones with the labels "xC," "MD," or "RC"). Further, if any of the words in a cluster belongs to the existing stop word data set, all the keywords in that cluster can be added to the stop words data set for future use if they don't exist in the stop words data set already.

After the cluster centers (or clusters) have been filtered, the remaining cluster centers are considered valid. The keywords corresponding to those filtered cluster centers are termed valid keywords or valid values. As described above, the cluster filter 234 is configured to send the valid values to the sub answer generator 236 and sub comments generator 238.

The answer subset generator 236 is configured to, upon receiving the valid values from the cluster filter 234 and the answer set from the answer set extractor 228, filter the answer set using the valid values to obtain an answer subset, and send the answer subset to the top candidate answer generator 240. For each answer in the answer set, if it contains any keyword in the valid values, the answer subset generator 236 preserves this answer and adds it to the answer subset. Otherwise, if the answer doesn't include any of the valid values, the answer is dropped and is not included in the answer subset.

The comment subset generator 238 is configured to, upon receiving the valid values from the cluster filter 234 and the comment set from the comment set extractor 224, filter the comment set using the valid values to form a comment subset, and send the comment subset to the top candidate answer generator 240. For each comment in the retrieved comment set, if it contains any keyword in the valid values, the comment subset generator 238 preserves this product comment and adds it to the comment subset. Otherwise, if the comment doesn't include any of the valid values, the comment is dropped and is not included in the comment subset.

The top candidate answer generator 240 is configured to, upon receiving the answer subset and the comment subset, compare the answer subset and the comment subset, and generate the top candidate answers for the customer service representatives. In certain embodiments, a number of top candidates to generate is predetermined, which could be in a range of 3-10, and in one embodiment is 5. In certain embodiments, the top candidate answer generator 240 employs following procedures to generate the top comments. Please note each QA answer in the answer subset or product comment in the sub comment subset may contain one or multiple sentences.

For each sentence in the comment subset, the top candidate answer generator 240 is configured to determine comment sentence-answer sentence similarities between the sentence in the comment subset and all the sentences in the answer subset, and take the average of the comment sentence-answer sentence similarities as the comment sentence-answer subset similarity between this comment sentence and the answer subset. By repeating this process, the top candidate answer generator 240 is configured to obtain the comment sentence-answer subset similarities between each of the sentences in the comment subset to the answer subset. The top candidate answer generator 240 is then configured to rank the comment sentences in the comment subset based on their comment sentence-answer subset similarities, and choose certain number of comment sentences that has the highest comment sentence-answer subset similarities in the list. In certain embodiments, top 3-10 comment sentences are selected. In one embodiment, the top candidate answer generator 240 is configured to select top 5 comments (or comment sentences).

The top candidate answer generator 240 is configured to calculate comment sentence-answer sentence similarity as follows, where the two sentences are termed $S_A$ and $S_B$ to generalize the procedure:

1. Decompose sentence $S_A$ into word vectors using the word2vec model discussed earlier as $\{v_1, v_2 \ldots, v_m\}$. Similarly, decompose $S_B$ as $\{v_1, v_2, \ldots, v_n\}$. Kindly note $v_1$ and $v_2$ are for illustration of the word vectors only, and for example $v_1$ for the sentence $S_A$ is very likely different from the $v_1$ for the sentence $S_B$.
2. Construct a matrix of word vector similarities $s(v_i, v_j)$, where vectors $\{v_1, v_2 \ldots, v_m\}$ from $S_A$ are rows, and vectors $\{v_1, v_2, \ldots, v_n\}$ from $S_B$ are columns, and $s(v_i, v_j)$ is the similarity distance between vector $v_i$ of $S_A$ and vector $v_j$ of $S_B$ in the vector space which can be calculated using SNN or cosine similarity method. The greater the value of $s(v_i, v_j)$, the more similar the vectors $v_i$ and $v_j$.
3. Determine the inverse document frequency (IDF) for each word vector in $S_A$. IDF is intended to represent how important a word is to a document in a collection of corpus. The IDF for vector $v_i$ can be calculated with formula $$idf_i = \log \frac{C}{c_i + 1},$$

where C is the total number of comments and $c_i$ is the total number of comments containing the word corresponding to the vector $v_i$.

4. Now the similarity between the two sentences $S_A$ and $S_B$ can be calculated as:

$$sim(S_A, S_B) = \sum_{i=1}^{m} idf_i \times \max_{j=1 \, to \, n} s(v_i, v_j).$$

In this formula, there are m number of vectors in the sentence $S_A$ and n number of vectors in the sentence $S_B$. For each vector i in the sentence $S_A$, there is a corresponding $idf_i$, and a highest similarity exists between the vector i and the vector j in the sentence $S_B$ (higher than any similarities between the vector i and any of the n number of vectors in the sentence $S_B$ other than the vectors j), this highest similarity is denoted $$\max_{j=1 \, to \, n} s(v_i, v_j).$$

The similarity between sentences is not only used by the top candidate answer generator 240 to compare sentences in the comment subset and sentences in the answer subset, but also used by the most similar question identifier 226 to compare the question sentence with all or part of the question sentences in the QA knowledge base 260.

Figure 3:
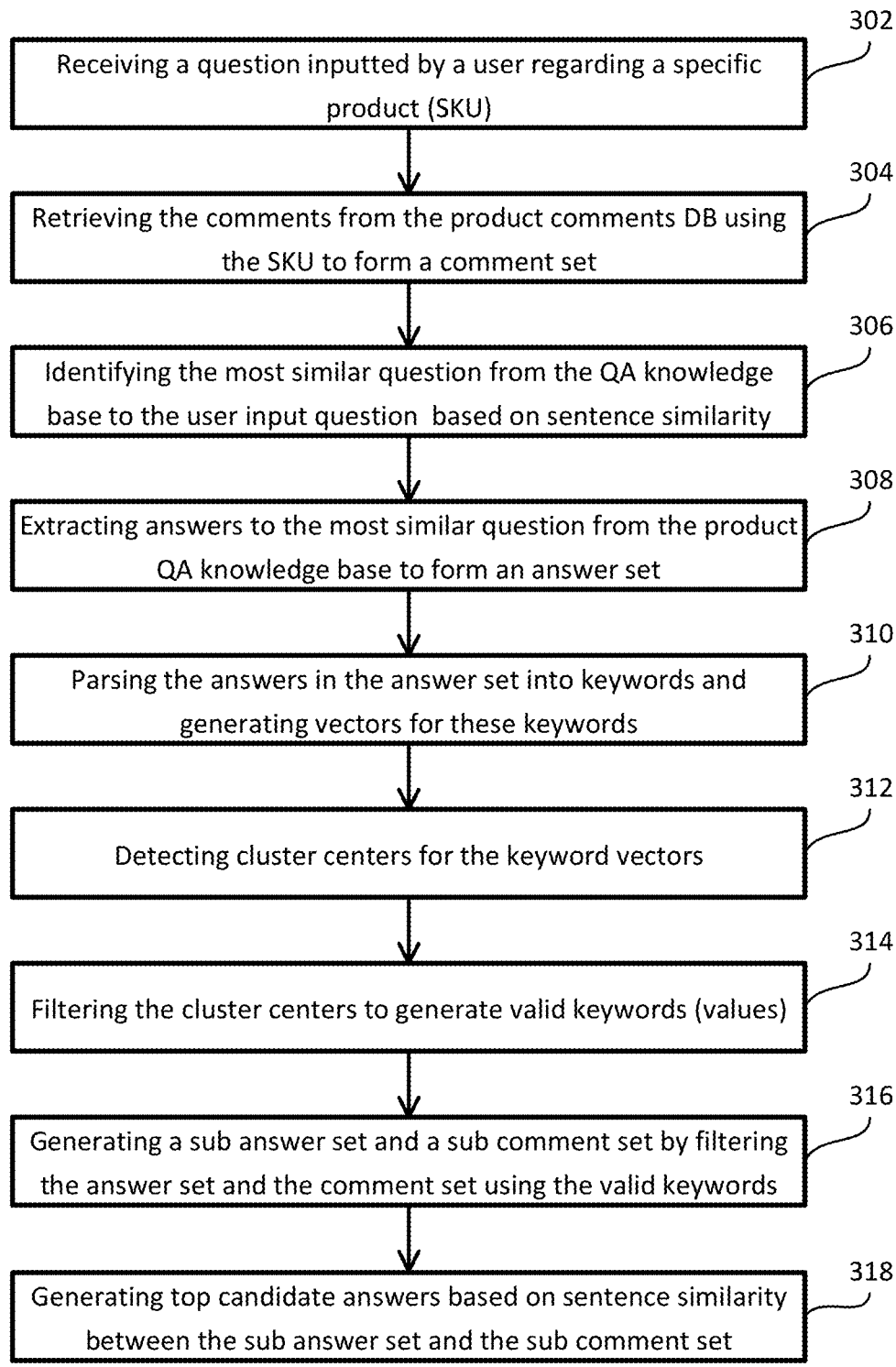
FIG. 3 schematically depicts a method to generate an answer to a customer question according to certain embodiments of the present disclosure.

FIG. 3 schematically depicts a method for generating an answer to a customer question according to certain embodiments of the present disclosure. In certain embodiments, the method is implemented by the computing device 210 shown in FIG. 2. In certain embodiments, the method shown in FIG. 3 corresponds to the function of the answer generation application 220. It should be particularly noted that, unless otherwise stated in the present disclosure, the steps of the method may be arranged in a different sequential order and are thus not limited to the sequential order as shown in FIG. 3.

As shown in FIG. 3, at procedure 302, the user question receiver (or customer question receiver) 222 takes a user or customer inquiry question about a product through an user interface. Since the question is asked for a specific product, the product's identification (sku_id or SKU) is known at this point. Upon receiving the question, the user question receiver 222 sends at least one of the user question and the associated SKU to the comment set extractor 224 and the most similar question identifier 226.

At procedure 304, upon receiving the product SKU (and optionally the user question), the comment set extractor 224 retrieves comments indexed by the SKU from the product comments DB 280 to form a comment set, and sends the comment set to the comment subset generator 238. In certain embodiments, the comment set extractor 224 may also keep the comment set in a temporary memory and make the comment set accessible by the comment subset generator 238.

At procedure 306, upon receiving the user question (and optionally the SKU), the most similar question identifier 226 compares the sentence-sentence similarity between the user question and the questions in the QA knowledge base 260, and the one question in the QA knowledge base 260 having the highest sentence similarity to the user question is defined as the most similar question. The most similar question identifier 226 then sends the most similar question to the answer set extractor 228. In certain embodiments, the similarity between the user inquiry question and the questions in the QA knowledge base 260 is calculated using the method described in FIG. 5 and the question in the QA knowledge base 260 that has the maximum similarity to the user inputted question is returned as the most similar question. In certain embodiments, instead of comparing the user question to all the questions in the QA knowledge base 260, the most similar question identifier 226 compares the user question only to the related questions in the QA knowledge base 260. For example, if the user question is about a cell phone, the questions in the QA knowledge base 260 that are under the electronics category or cell phone category are used for comparison.

At procedure 308, upon receiving the most similar question, the answer set extractor 228 extracts the answers to the most similar question from the QA knowledge base 260, arranges those extracted answers to form an answer set, and sends the answer set to the keyword tokenizer & vector generator 230 and the answer subset generator 236. In certain embodiments, the answer set extractor 228 may also keep the answer set in a temporary memory and make it available for the keyword tokenizer & vector generator 230 and the answer subset generator 236. In certain embodiments, only the most similar question is used for retrieving the answers. In other embodiments, the SKU may also be used for retrieving the answers For example, the question-answers in the QA knowledge base 260 may be organized by product categories, and the SKU of the product described in the user inputted question may be used to determine from which category those answers should be retrieved. In other words, the answer set extractor 228 may use both the most similar question and the SKU for extracting answers, either to limit the extraction to obtain fewer answers, or expand the extraction to obtain more answers. In certain embodiments, the answer set extractor 228 only includes the extracted answers in the answer set. In other embodiments, the answer set extractor 228 may also put the most similar question in the answer set.

At procedure 310, upon receiving the answer set, the keyword tokenizer and vector generator 230 first decomposes each answer into a series of keywords (tokens). It then checks the length of the keywords. In certain embodiments, the answers in the answer set are Chinese answers, only keywords containing more than one Chinese character are kept, otherwise the keywords are dropped. In certain embodiments, the keyword tokenizer and vector generator 230 may also use other criteria to filter the keywords, such as removing English words and numbers in a Chinese answer. In certain embodiments, the keyword tokenizer and vector generator 230 uses a regular expression to filter the keywords. After decomposing and filtering, the keyword tokenizer and vector generator 230 then uses word2vec to generate vectors for the remaining keywords through for example word embedding and embedding lookup. In certain embodiment, the resulting vectors are each constructed with 300 dimensions. The answer tokenizer and keyword vector generator 230 then sends the generated keyword vectors to the cluster center detector 232.

At procedure 312, upon receiving the keyword vectors, the cluster center detector 232 detects cluster centers for the keyword vectors, and sends the cluster centers to the cluster filter 234. In certain embodiments, the cluster center detector 232 may also arrange all the keyword vectors into clusters based on the detected cluster centers. In certain embodiments, the cluster center detector 232 employs an automatic clustering method. This automatic clustering method is a multi-step process, which is explained in detail in FIG. 4. The main idea here is that the keywords corresponding to the cluster centers are the most representative topics discussed/mentioned in the initial answer set corresponding to the most similar question.

At procedure 314, upon receiving the generated cluster centers, the cluster filter 234 checks the cluster centers and discard invalid cluster center, and sends the filtered cluster centers to the answer subset generator 236 and the comment subset generator 238. Different filtering methods can be used. In certain embodiment, the cluster filter 234 uses a deep parser engine to remove invalid clusters. In certain embodiments, the deep parser is an external component accessible via an API call. The cluster filter 234 calls the deep parser by passing in the cluster center keywords. The deep parser returns the features of the keywords called. The cluster filter 234 deems a keyword valid only if its word feature is certain form of verb or noun.

At procedure 316, upon receiving the valid values (the keywords corresponding to the cluster centers, after filtering), the answer subset generator 236 filters the extracted answer set using the valid values to obtain answer subset. For each answer in the answer set, if it contains any keyword in the valid values, the answer subset generator 236 preserves this answer and adds it to the answer subset, otherwise, if the answer doesn't include any of the valid values, the answer is discarded. After generating the answer subset, the answer subset generator 236 sends the answer subset to the top candidate answer generator 240.

At the same time, upon receiving the valid values, the comment subset generator 238 filters the retrieved comment set using the valid values to obtain comment subset. For each comment in the comment set, if it contains any keyword in the valid values, the comment subset generator 238 preserves this product comment and adds it to the comment subset, otherwise, the comment is discarded. The comment subset generator 238 then sends the formed comment subset to the top candidate answer generator 240.

At procedure 318, upon receiving the answer subset and the comment subset, the top candidate answer generator 240 generates the top K candidate answers for the CSR to select from and respond to the user using the selected one answer from the top K candidate answers. K is a predetermined positive integer. Specifically, for each sentence in the comment subset, the top candidate answer generator 240 determines its sentence similarity with each sentence in the answer subset. The method to calculate sentence similarity is detailed in FIG. 5. The top candidate answer generator 240 calculates the sentence similarities between one of the comments in the comment subset and the answers in the answer subset, and uses the average of the sentence similarities as the similarity between the comment and the answer subset. Finally, once the sentence to answer subset similarities of all comments are calculated, the top candidate answer generator 240 ranks the comments in the comment subset based on the values of the similarities from top to bottom, and chooses a predetermined number of comments in the top of the list as candidate answers. In certain embodiments, the predetermined number is 2-10. In certain embodiments, the predetermined number is 3-5. In one embodiment, the predetermined number is 5. After that, the top candidate answer generator 240 presents those top candidate answers to the CSR for example through a graphic user interface, and the CSR can choose one from the top candidate answers as the final answer, and present that answer to the user or customer. In certain embodiments, the top candidate answer generator 240 may also present the top comment in the list directly to the customer.

Figure 4:
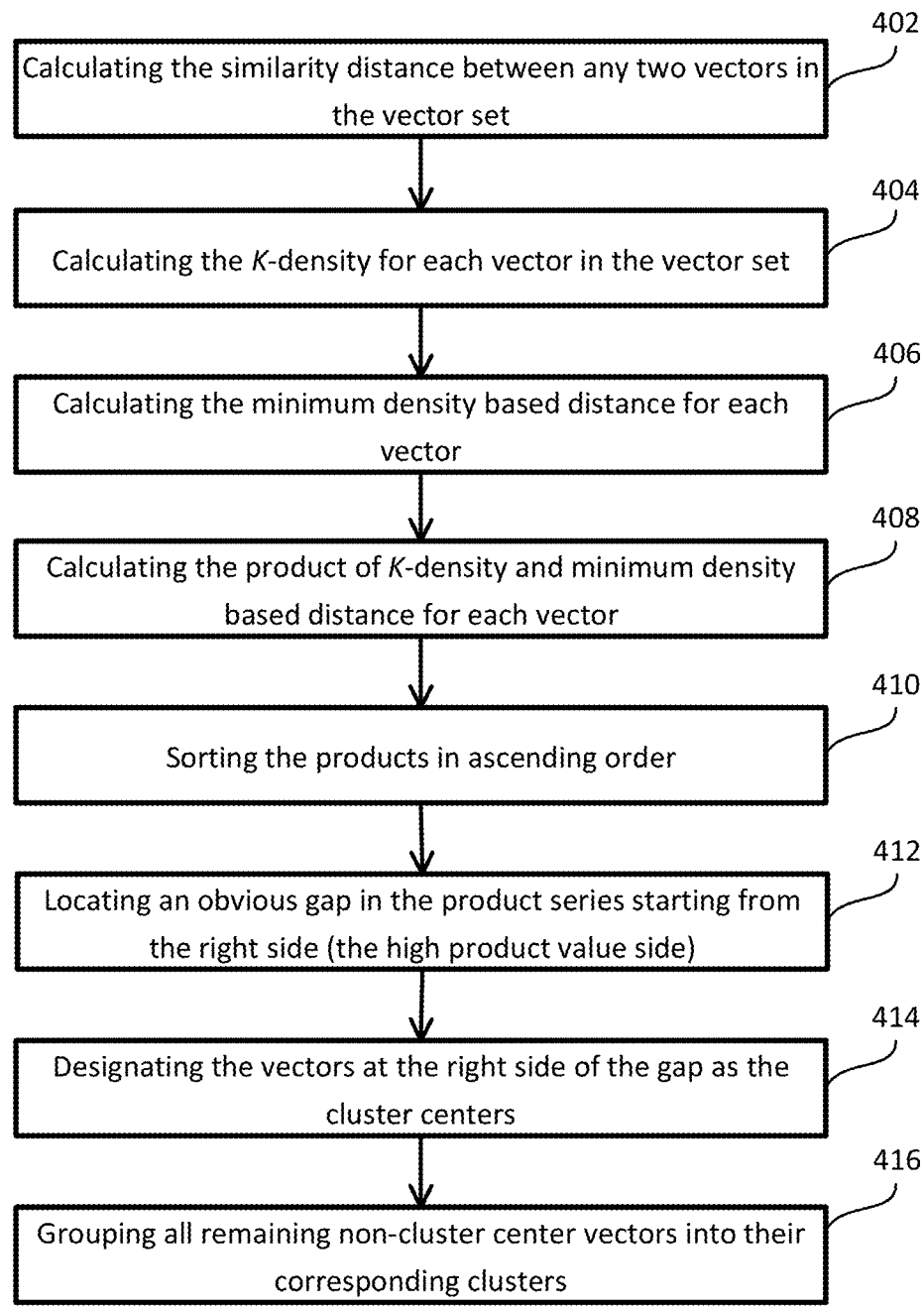
FIG. 4 schematically depicts a method to detect cluster centers from a set of vectors according to certain embodiments of the present disclosure.

FIG. 4 schematically depicts a method for detecting cluster centers from a set of vectors and separating the set of vectors into a series of clusters which build around those detected cluster centers according to certain embodiments of the present disclosure. In certain embodiments, the method is implemented by the computing device 210 shown in FIG. 2. It should be particularly noted that, unless otherwise stated in the present disclosure, the steps of the method may be arranged in a different sequential order and are thus not limited to the sequential order as shown in FIG. 4.

As shown in FIG. 4, at procedure 402, the cluster center detector 232 receives a set of vectors from the keyword tokenizer & vector generator 230, and calculates similarity distances between any two vectors in the vector set. In certain embodiment, the distance between two vectors is calculated using the shared nearest neighborhood (SNN) method. In certain embodiment, the distance between two vectors is calculated using cosine similarity method. The similarity distance between two vectors is denoted as $s_{i,j}$, i.e., similarity distance between the vector i and the vector j. The larger the value of $s_{i,j}$, i.e., the closer or more similar the two vectors.

At procedure 304, the cluster center detector 232 calculates the K-density for each vector using the distances calculated in procedure 302. The K-density for each vector i is denoted as $\hat{\rho}_i$ and can be calculated using formula:

$$\hat{\rho}_i = \frac{K}{\sum_{j=1}^{K} d_{i,j}}.$$

is a predetermined positive integer. In certain embodiments, K is set in a range of 10-100. In one embodiment, K is set at 10. In certain embodiment, K is defined as $\lfloor \sqrt{n} \rfloor$, where n is the total number of the keyword vectors in the vector set. The K vectors are K nearest neighbors to the vector i.

At procedure 406, the cluster center detector 232 calculates the minimum density-based distance for each vector, using the distances calculated in procedure 302 and the K-densities calculated in procedure 304. The minimum density-based distance is denoted as $\hat{\delta}_i$ and can be calculated using formula $$\hat{\delta}_i = \min_{l \neq i \wedge \hat{\rho}_l > \hat{\rho}_i} (d_{i,l}).$$

The vector l has a K-density greater than that of the vector i, and the vector l is closer to the vector i in the vector space than any other high K-density vectors (higher K-density than that of the vector i).

At procedure 408, the cluster center detector 232 calculates the product of the K-density and minimum density-based distance for each vector. The product can be calculated using formula $x_i = \hat{\rho}_i \times d_{i,j}$.

At procedure 410, the cluster center detector 232 sorts the products from procedure 308 of all vectors in ascending order (or alternatively in descending order).

At procedure 412, the cluster center detector 232 detects an obvious gap in this product series from the right to the left, or in other words, from the high product values to the low product values. It starts from the rightmost vector toward left and calculates the product value difference between the current vector and its left neighbor. It then compares the difference to last difference (if it exists). If the change in these two differences reach a certain threshold, the cluster center detector 232 deems a gap exists between the current vector and its left neighbor. The threshold must be bigger than 100%. In certain embodiments, the threshold is set in a range of 120%-500%. In certain embodiment, the threshold is set at 150%, i.e., when the current difference is bigger than 150% of the last difference, a gap is thought to exist between the current vector and its left neighbor. The gap location is recorded. Kindly note only one gap need to be determined starting from the right side or the high product value side, and the process stops when the one gap is found. In certain embodiments, because we at least need certain number of clusters, the cluster center detector 232 may start from the $5^{th}$-$10^{th}$ vector from the right side instead of from the rightmost vector.

At procedure 414, the cluster center detector 232 designates all the vectors at the right side of the gap as the cluster centers.

The method may optionally include a procedure 416, in which the cluster center detector 232 forms a series of clusters. Each cluster is built around one of the cluster centers detected at procedure 314. All non-center vectors are assigned to one of the clusters.

Figure 5:
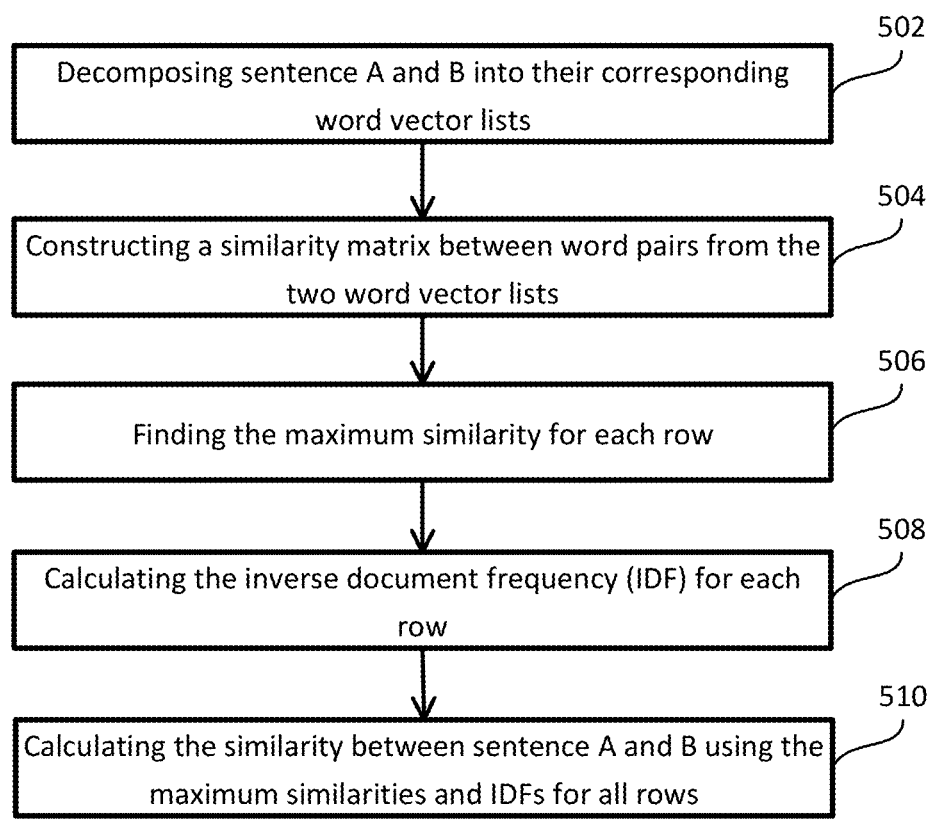
FIG. 5 schematically depicts a method to calculate similarity between two sentences according to certain embodiments of the present disclosure.

FIG. 5 schematically depicts a method for calculating similarity between two sentences according to certain embodiments of the present disclosure. In certain embodiments, the method is implemented by the computing device 210 shown in FIG. 2. In certain embodiments, the method shown in FIG. 5 is a common utility tool and is used in the most similar question detector 226 and the top candidate answer generator 240. It should be particularly noted that, unless otherwise stated in the present disclosure, the steps of the method may be arranged in a different sequential order and are thus not limited to the sequential order as shown in FIG. 5.

As shown in FIG. 5, at procedure 502, the method/tool decomposes the two passed in sentences $S_A$ and $S_B$ into a series of word vectors using word2vec as $\{v_1, v_2, \ldots, v_m\}$ and $\{v_1, v_2, \ldots, v_n\}$, respectively.

At procedure 504, the method/tool constructs a matrix of word vector similarities, where vectors $\{v_1, v_2, \ldots, v_m\}$ from $S_A$ are rows of the matrix, and vectors $\{v_1, v_2, \ldots, v_n\}$ from $S_B$ are columns. Each cell of the matrix is the similarity between two word vectors and is calculated by the similarity distance between vector $v_i$ and vector $v_j$, i.e., $s(v_i, v_j)$, in the vector space using SNN or cosine similarity method.

At procedure 506, for each row of the matrix, the method/tool finds the cell having the maximum similarity.

At procedure 508, the method/tool determines the inverse document frequency (IDF) for each word vector in $S_A$. The IDF for vector $v_i$ can be calculated with formula $$idf_i = \log\frac{C}{C_i+1},$$

where C is the total number of comments/sentences and $C_i$ is the total number of comments containing the word of $v_i$. The comments used here are the product comments retrieved for the product the user question is about.

At procedure 510, the method/tool calculates the similarity between the two sentences as $$sim(S_A, S_B) = \sum_{i=1}^{m} idf_i \times \max_{j=1 \text{ to } n} s(v_i, v_j).$$

The higher the value of $sim(S_A, S_B)$, the more similar the two sentences $S_A$ and $S_B$.

Figure 6:
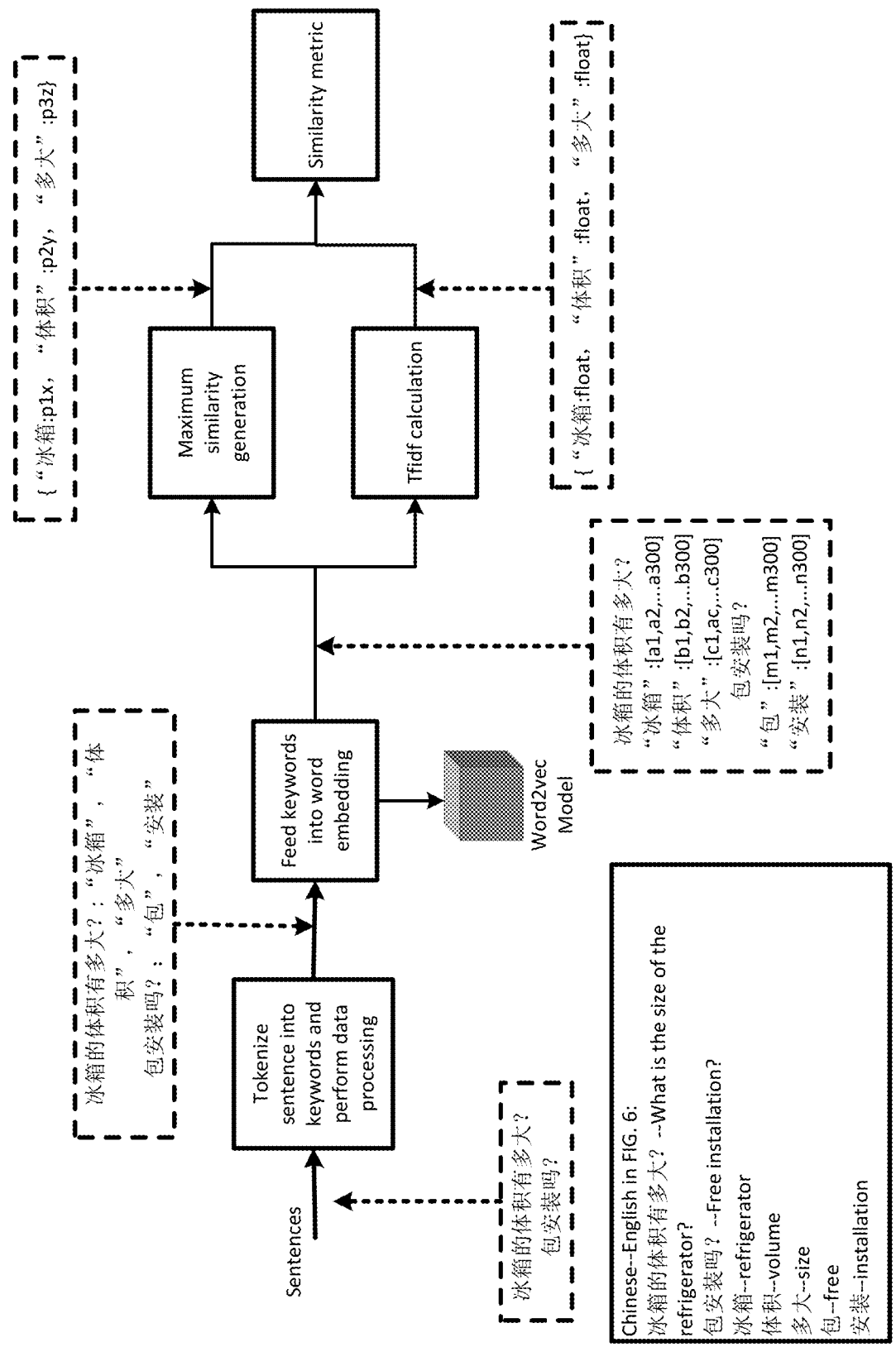
FIG. 6 schematically depicts an example of calculating similarity between two sentences according to certain embodiments of the present disclosure.

FIG. 6 schematically shows an example of sentence similarity measurement according to the disclosure. As shown in FIG. 6, two questions (sentences) are inputted to the system. The two sentences are respectively tokenized into keywords, and cleaning is performed to retain only verbs and nouns. The filtered keywords were converted to vectors using the word2vector model, where each vector has 300 dimensions. For the keyword vectors from the first sentence, maximum similarity distance are generated and IDF are calculated. The maximum similarity distance and the IDF for each keyword vector from the first sentence are multiplied to form a product for that keyword vector. The products for all the vectors are then put into similarity metric, and the sentence similarity between the two sentences are determined from the similarity metric.

In summary, certain embodiments of the present disclosure provides a framework for building an answer generation system based on word embedding, utilizing QA question answer data and product comment data available on an e-commerce platforms. The QA knowledge base 260 includes questions and answers all through the e-commerce platform, while the product comment DB 280 includes comments specific to products (SKUs). By using the information all through the e-commerce platform to evaluate and limit the specific comments in the product comment DB 280, the disclosure provides accurate prediction for candidate answers to customer's questions. Further, by a specific design of the clustering of the keyword vectors from the QA knowledge base 260, especially the novel method to determine cluster centers based on a gap in a list of density and distance products, certain embodiments of the disclosure can efficiently select important keywords from a large number of keywords. In addition, certain embodiments of the disclosure uses similarity distance and IDF to evaluate similarities between sentences, which helps to choose a question from the QA knowledge base 260 that is most similar to the customer's question, and helps to determine top candidate answers from certain number of selected comments.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. U.S. Pat. No. 8,819,007 B2, Providing answers to questions using multiple models to score candidate answers, International Business Machines Corp, 2014.
2. Guangtao Wang and Qinbao Song, Automatic clustering via outward statistical testing on density metrics, IEEE Transactions on Knowledge and Data Engineering, 2016, 28 (8): 1971-1985.
3. Hongjie Jia et al., Self-tuning p-spectral clustering based on shared nearest neighbors, Cognitive Computation, 2015, 7(5): 622-632.

What is claimed is:

1. A system for generating an answer to a question, the system comprising a computing device, the computing device comprising a processor and a storage device storing computer executable code, wherein the computer executable code, when executed at the processor, is configured to:
   receive the question inputted by a user regarding a product;
   extract target answers from a question-answer (QA) knowledge base using the question to form an answer set;
   extract user comments regarding the product from a comment database to form a comment set;
   cluster keywords in the answer set to obtain cluster centers;
   filter the answer set and the comment set using the cluster centers to obtain answer subset and comment subset; and
   generate the answer to the question from the comment subset, wherein the answer is selected from the comment subset and has high sentence similarity to sentences in the answer subset.

2. The system of claim 1, wherein the computer executable code is configured to extract answers from the QA knowledge base by:

calculating sentence similarities between the question inputted by the user and questions in the QA knowledge base; and defining one of the questions in the QA knowledge base that has a maximum similarity among the calculated similarities as a most similar question, wherein the target answers are answers to the most similar question.

3. The system of claim 2, wherein the computer executable code is configured to calculate the sentence similarity between the question inputted by the user and one of the answers in the QA knowledge base by:

decomposing the question inputted by the user into word vectors $v_{A1}, v_{A2}, \ldots, v_{Am}$ using a word2vec model, and decomposing the one of the answers in the QA knowledge base into word vectors as $v_{B1}, v_{B2}, \ldots, v_{Bn}$ using the word2vec model, wherein the question inputted by the user is represented by $S_A$ and comprises m number of words, and the one of the answers in the QA knowledge base user is represented by $S_B$ and comprises n number of words;

calculating a similarity distance $s(v_i, v_j)$ between one of the vectors in $S_A$ and one of the vectors in $S_B$, wherein i is one of A1 to Am, and j is one of B1 to Bm;

calculating an inverse document frequency (IDF) for the word vector $v_i$ as:

$$idf_i = \log \frac{C}{C_i + 1},$$

wherein C is a total number of comments in the comment database, and $C_i$ is a total number of comments in the comment database that contain the word corresponding to the word vector $v_i$; and calculating the sentence similarity between $S_A$ and $S_B$ using:

$$sim(S_A, S_B) = \sum_{i=1}^{m} idf_i \times \max_{j=1 \text{ to } n} s(v_i, v_j).$$

4. The system of claim 1, wherein the computer executable code is configured to cluster the keywords in the answer set to obtain the cluster centers by:

converting keywords in the answer set into keyword vectors;

calculating a K-density $\hat{\rho}_I$ of one of the keyword vector i by:

$$\hat{\rho}_I = \frac{K}{\sum_{j=1}^{K} d_{i,j}},$$

wherein $\hat{\rho}_I$ is the K-density of the keyword vector i, $d_{i,j}$ is a distance between the keyword vector i and one of the keyword vectors j, K is a predetermined positive integer, and the keyword vectors j from 1 to K are nearest neighbors of the keyword vector i;

calculating a minimum density-based distance $\hat{\delta}_I$ by:

$$\hat{\delta}_I = \min_{l \neq i \wedge \hat{\rho}_l > \hat{\rho}_i} (d_{i,l}),$$

wherein l is one of the keyword vectors that has a K-density $\hat{\rho}_l$ higher than the K-density $\hat{\rho}_i$ and is the nearest to the keyword vector i;

calculating a keyword vector product $x_i$ by $x_i = \hat{\rho}_i \times d_{i,j}$ for each keyword vector i; and selecting a plurality of the keyword vectors as cluster centers based on the values of the keyword vector products, wherein values of the keyword vector product of the cluster centers are greater than values of the keyword vector product of non-cluster centers.

5. The system of claim 4, wherein the keyword vectors are indexed by integers 1 to n sequentially base on the values of the keyword vector products from low to high, a non-cluster center having a highest keyword vector product has the index o, and $x_{o+1} - x_o \geq 1.5 \times (x_{o+2} - x_{o+1})$.

6. The system of claim 5, wherein n–o is greater than 5.

7. The system of claim 4, wherein K is $\lfloor \sqrt{n} \rfloor$, and n is a total number of the keywords in the answer set.

8. The system of claim 7, wherein the predetermined number is in a range of 3-10.

9. The method of claim 7, wherein the predetermined number is in a range of 3-10.

10. The system of claim 1, wherein the computer executable code is configured to generate the answer to the question by:

calculating sentence similarities between sentences in the comment subset and sentences in the answer subset;

defining an average sentence similarity value between one of the sentences in the comment subset and all the sentences in the answer subset as a sentence-answer subset similarity value of the one of the sentences in the comment subset;

selecting a predetermined number of sentences in the comment subset that have highest sentence-answer subset values; and choosing one of the predetermined number of sentences as the answer to the question.

11. The system of claim 1, wherein the step of calculating sentence similarities between sentences in the comment subset and sentences in the answer subset comprises:

decomposing one of the sentences in the comment subset into word vectors $v_{D1}, v_{D2}, \ldots, v_{Dp}$ using a word2vec model, and decomposing the one of the sentences in the answer subset into word vectors as $v_{E1}, v_{E2}, \ldots, v_{Eq}$ using the word2vec model, wherein the one of the sentences in the comment subset is represented by $S_D$ and comprises p number of words, and the one of sentences in the sub answer set is represented by $S_E$ and comprises q number of words;

calculating a similarity distance $s(v_i, v_j)$ between one of the vectors in $S_D$ and one of the vectors in $S_E$, wherein i is one of D1 to Dp, and j is one of E1 to Eq;

calculating an inverse document frequency (IDF) for the word vector $v_i$ as:

$$idf_i = \log \frac{C}{C_i + 1},$$

wherein C is a total number of sentences in the comment subset, and $C_i$ is a total number of sentences in the comment subset that contain the word corresponding to the word vector $v_i$; and calculating the sentence similarity between $S_D$ and $S_E$ using:

$$sim(S_D, S_E) = \sum_{i=1}^{p} idf_i \times \max_{j=1 \text{ to } q} s(v_i, v_j).$$

12. A method for generating an answer to a question, comprising:
   receiving, by a computing device, the question inputted by a user regarding a product;
   extracting, by the computing device, target answers from a question-answer (QA) knowledge base using the question to form an answer set;
   extracting, by the computing device, user comments regarding the product from a comment database to form a comment set;
   clustering, by the computing device, keywords in the answer set to obtain cluster centers;
   filtering, by the computing device, the answer set and the comment set using the cluster centers to obtain answer subset and comment subset; and
   generating, by the computing device, the answer to the question from the comment subset, wherein the answer is selected from the comment subset and has high sentence similarity to sentences in the answer subset.

13. The method of claim 12, wherein the step of extracting answers from the QA knowledge base comprises:
   calculating sentence similarities between the question inputted by the user and questions in the QA knowledge base; and
   defining one of the questions in the QA knowledge base that has a maximum similarity among the calculated similarities as a most similar question, wherein the target answers are answers to the most similar question.

14. The method of claim 13, wherein the step of calculating the sentence similarity between the question inputted by the user and one of the answers in the QA knowledge base comprises:
   decomposing the question inputted by the user into word vectors $v_{A1}, v_{A2}, \ldots, v_{Am}$ using a word2vec model, and decomposing the one of the answers in the QA knowledge base into word vectors as $v_{B1}, v_{B2}, \ldots, v_{Bn}$ using the word2vec model, wherein the question inputted by the user is represented by $S_A$ and comprises m number of words, and the one of the answers in the QA knowledge base user is represented by $S_B$ and comprises n number of words;
   calculating a similarity distance $s(v_i, v_j)$ between one of the vectors in $S_A$ and one of the vectors in $S_B$, wherein i is one of A1 to Am, and j is one of B1 to Bm;
   calculating an inverse document frequency (IDF) for the word vector $v_i$ as:

$$idf_i = \log\frac{C}{C_i + 1},$$

wherein C is a total number of comments in the comment database, and $C_i$ is a total number of comments in the comment database that contain the word corresponding to the word vector $v_i$; and
   calculating the sentence similarity between $S_A$ and $S_B$ using:

$$sim(S_A, S_B) = \sum_{i=1}^{m} idf_i \times \max_{j=1 \text{ to } n} s(v_i, v_j).$$

15. The method of claim 12, wherein the step of clustering the keywords in the answer set to obtain the cluster centers comprises:
   converting keywords in the answer set into keyword vectors;
   calculating a K-density $\hat{\rho}_i$ of one of the keyword vector i by:

$$\hat{\rho}_i = \frac{K}{\sum_{j=1}^{K} d_{i,j}},$$

wherein $\hat{\rho}_i$ is the K-density of the keyword vector i, $d_{i,j}$ is a distance between the keyword vector i and one of the keyword vectors j, K is a predetermined positive integer, and the keyword vectors j from 1 to K are nearest neighbors of the keyword vector i;
   calculating a minimum density-based distance $\hat{\delta}_i$ by:

$$\hat{\delta}_i = \min_{l \neq i \wedge \hat{\rho}_l > \hat{\rho}_i}(d_{i,l}),$$

wherein l is one of the keyword vectors that has a K-density $\hat{\rho}_l$ higher than the K-density $\hat{\rho}_i$ and is the nearest to the keyword vector i;
   calculating a keyword vector product $x_i$ by $x_i = \hat{\rho}_i \times d_{i,j}$ for each keyword vector i; and
   selecting a plurality of the keyword vectors as cluster centers based on the values of the keyword vector products, wherein values of the keyword vector product of the cluster centers are greater than values of the keyword vector product of non-cluster centers.

16. The method of claim 15, wherein the keyword vectors are indexed by integers 1 to n sequentially base on the values of the keyword vector products from low to high, a non-cluster center having a highest keyword vector product has the index o, and $x_{o+1} - x_o \geq 1.5 \times (x_{o+2} - x_{o+1})$.

17. The system of claim 15, wherein K is $\lfloor \sqrt{n} \rfloor$, and n is a total number of the keywords in the answer set.

18. The method of claim 12, wherein the step of generating the answer to the question comprises:
   calculating sentence similarities between sentences in the comment subset and sentences in the answer subset;
   defining an average sentence similarity value between one of the sentences in the comment subset and all the sentences in the answer subset as a sentence-answer subset similarity value of the one of the sentences in the comment subset;
   selecting a predetermined number of sentences in the comment subset that have highest sentence-answer subset values; and
   choosing one of the predetermined number of sentences as the answer to the question.

19. The method of claim 12, wherein the step of calculating sentence similarities between sentences in the comment subset and sentences in the answer subset comprises:
   decomposing one of the sentences in the comment subset into word vectors $v_{D1}, v_{D2}, \ldots, v_{Dp}$ using a word2vec model, and decomposing the one of the sentences in the answer subset into word vectors as $v_{E1}, v_{E2}, \ldots, v_{Eq}$ using the word2vec model, wherein the one of the sentences in the comment subset is represented by $S_D$ and comprises p number of words, and the one of sentences in the sub answer set is represented by $S_E$ and comprises q number of words;

calculating a similarity distance $s(v_i, v_j)$ between one of the vectors in $S_D$ and one of the vectors in $S_E$, wherein i is one of D1 to Dp, and j is one of E1 to Eq;

calculating an inverse document frequency (IDF) for the word vector $v_i$ as:

$$idf_i = \log\frac{C}{C_i + 1},$$

wherein C is a total number of sentences in the comment subset, and $C_i$ is a total number of sentences in the comment subset that contain the word corresponding to the word vector $v_i$; and calculating the sentence similarity between $S_D$ and $S_E$ using:

$$sim(S_D, S_E) = \sum_{i=1}^{p} idf_i \times \max_{j=1 \text{ to } q} s(v_i, v_j).$$

20. A non-transitory computer readable medium storing computer executable code, wherein the computer executable code, when executed at a processor of a computing device, is configured to:

receive the question inputted by a user regarding a product;

extract target answers from a question-answer (QA) knowledge base using the question to form an answer set;

extract user comments regarding the product from a comment database to form a comment set;

cluster keywords in the answer set to obtain cluster centers;

filter the answer set and the comment set using the cluster centers to obtain answer subset and comment subset; and generate the answer to the question from the comment subset, wherein the answer is selected from the comment subset and has high sentence similarity to sentences in the answer subset.

\* \* \* \* \*